United States Patent [19]
Bertini

[11] Patent Number: 5,200,234
[45] Date of Patent: Apr. 6, 1993

[54] METHOD FOR RESTORING UNDERGROUND ELECTRICAL CABLE

[75] Inventor: Glen J. Bertini, Bay County, Mich.

[73] Assignee: Dow Corning Corporation, Midland, Mich.

[21] Appl. No.: 809,633

[22] Filed: Dec. 16, 1991

[51] Int. Cl.$^5$ ............................................... B05D 5/12
[52] U.S. Cl. ..................................... 427/118; 427/140
[58] Field of Search ......................... 427/117, 118, 140

[56] References Cited

U.S. PATENT DOCUMENTS

| | | | |
|---|---|---|---|
| 3,252,834 | 5/1966 | Vincent et al. | 427/117 X |
| 3,527,874 | 9/1970 | Hayami | 174/24 |
| 4,144,202 | 3/1979 | Ashcraft et al. | 252/63.2 |
| 4,212,756 | 7/1980 | Ashcraft et al. | 252/63.2 |
| 4,299,713 | 11/1981 | Maringer et al. | 174/110 |
| 4,332,957 | 6/1982 | Braus et al. | 556/446 |
| 4,354,992 | 10/1982 | Bahder | 264/85 |
| 4,400,429 | 8/1983 | Barlow et al. | 428/379 |
| 4,608,306 | 8/1986 | Vincent | 428/391 |
| 4,766,011 | 8/1988 | Vincent et al. | 427/117 |
| 4,845,309 | 7/1989 | Vincent et al. | 174/23 |

Primary Examiner—Evan Lawrence
Attorney, Agent, or Firm—Alexander Weitz

[57] ABSTRACT

An improved method for the restoration of in-service underground residential distribution electrical cable which is positioned within a surrounding conduit is disclosed, the method comprising filling the space between the cable and the conduit with a homogeneous mixture of a silane antitreeing agent and a dielectric oil, the dielectric oil being completely miscible with said antitreeing agent and having a solubility in the polymeric insulation of the cable of less than 5 weight percent.

21 Claims, 1 Drawing Sheet

METHOD FOR RESTORING UNDERGROUND ELECTRICAL CABLE

FIELD OF THE INVENTION

The present invention relates to a method for the restoration of an in-service underground electrical distribution cable. More particularly, the instant invention relates to a method of contacting the exterior of the cable with a restorative fluid which comprises a silane antitreeing agent and a carrier dielectric oil.

BACKGROUND OF THE INVENTION

A major problem associated with electrical distribution cable is its tendency, over a period of time, to fail due to the progressive degradation of its insulation. The degradative processes involved in the failure of cables are correlated with two "treeing" phenomena. "Electrical treeing" is the product of numerous electrical discharges in the presence of strong electrical fields which eventually lead to the formation of voids within the insulation material. These voids resemble the trunk and branches of a tree in profile under microscopic observation, from which the descriptive terminology derives. As the trees formed by this process grow, they provide further routes along which corona discharges can occur, the cumulative effect being electrical breakdown of the insulation. Electrical treeing generally occurs when large voltages are imposed on the cable. The degradative results of the electrical treeing process can be precipitous such that the electrical cable can break down in a relatively short period of time.

The second type of treeing, known as "water treeing," is observed when the insulation material is simultaneously exposed to moisture and an electric field. This mechanism is much more gradual than electrical treeing, requiring an extended period of time to cause the degree of damage that affects the insulation characteristics of the distribution cable. However, since water treeing occurs at considerably lower electrical fields than required for the formation of electrical trees, this phenomenon is a leading cause of reduced service life of cables which allow water entry to the conductor region, whether through diffusion or some other mechanism.

Efforts have been made to prepare cables which are resistant to water treeing, an example of this approach being the teachings of Bahder in U.S. Pat. No. 4,354,992. Here, a method of fabricating a cable is described wherein a particular extrusion sequence allows a swelling of the insulation which results in a reduced number and size of voids which are precursors of trees. In addition, pressure curing the cable above its melting point followed by cooling under pressure was found to further improve resistance to trees.

In another approach, cable deterioration is minimized by limiting the amount of water which can enter the cable interior. Examples of this technique can be illustrated by U.S. Pat. No. 3,252,834 to Vincent, wherein a composition comprising a polyester resin, a silicone resin, an insecticide and a solvent is used to coat the interior of the cable, and U.S. Pat. No. 4,845,309 to Vincent et al., wherein a curable silicone "water block" is pumped into the cable's interior and subsequently crosslinked.

Yet another method used to prevent the degradation of cable insulation comprises filling the cable interior with an oil. Thus, U.S. Pat. No. 3,527,874 to Hayami teaches the use of silicon (sic) oil, or a silicon-hydrocarbon oil mixture, to fill the interstices between the conductor and insulation of an electrical distribution cable. Hayami teaches using low viscosity oils which can flow or exude through the cable's insulation layer. Thus the positive effects of the oil on the insulation would be lost when the oil leaks or exudes from the cable interior.

It is also known that water treeing can be reduced by the incorporation of an anti-tree additive (e.g., various organo silanes) directly into the insulation composition of the cable at time of manufacture.

The above described methods only address the issue of how to inhibit the formation of trees and the associated deterioration of insulation integrity. It will, however, be recognized that a vast network of underground cable is already in place wherein the cable either has not been treated according to one of these procedures or it has degenerated significantly despite such efforts and is therefore subject to premature failure. As a partial answer to industry's desire to extend the useful life of existing underground cables, it has been found that certain tree retardants can be introduced into the cable's interior to partially restore the insulation performance. An example of such a cable reclamation technique is found in U.S. Pat. No. 4,372,988 to Bahder. This patent teaches a method for reclaiming electrical distribution cable which comprises' purging the cable with a desiccant gas: then supplying, in a continuous fashion, a tree retardant liquid, such as polydimethylsiloxane fluid, to the interior of the cable. This disclosure also suffers from an above mentioned disadvantage in that the fluid can exude or leak from the cable, and this reference addresses the potential loss of fluid by providing reservoirs which can maintain a constant fluid level, further adding to the complexity of this system. A similar method was proposed by Vincent et al. in U.S. Pat. No. 4,766,011, wherein the tree retardant fluid was selected from a particular class of aromatic alkoxysilanes. Again, the tree retardant fluid was supplied to the interstices of the conductor of the cable. However, fluid of this prior art disclosure could be polymerized within the water tree voids in the insulation and therefore would not leak out of the cable.

Such reclamation methods are effective to an extent, but typically require complicated and specialized equipment to pump the restorative fluid into the relatively tight confines of the cable's interior, even when the fluid has a very low viscosity. The result is that a contractor often finds it economically equivalent, or even advantageous, to completely replace a cable once it has deteriorated rather than avail himself of one of the above restorative methods.

SUMMARY OF THE INVENTION

Applicant has now discovered an improved method for the restoration of underground electrical distribution cable which overcomes the aforementioned drawback. Unlike the prior art, the instant reclamation method comprises contacting the exterior of the cable with a restorative fluid which is a mixture of a silane antitreeing agent and a carrier dielectric oil. This method takes advantage of the fact that, in general, electrical cable used in underground residential distribution is encased in a plastic conduit so that the restorative fluid can fill the void space between the cable and the conduit. Since the cross-sectional area of this void space is relatively large when compared to that available to a fluid entering the cable's interior, there is no need for complex pumping equipment and even filling by gravity is feasible. Moreover, it has surprisingly been discovered that this method is much more efficient in saturating the damaged insulation of the cable with the antitreeing silane than the methods of the prior art, particularly when the restorative fluid is a mixture of one of the aromatic silanes disclosed by the above cited U.S. Pat. No. 4,766,011 to Vincent et al. and a polydimethylsiloxane oil. Additionally, the instant method permits the restoration of cable having a solid conductor, in which case an antitreeing agent can not be introduced into the cable's interior as suggested by the prior art. This would, of course, also hold true in the case of stranded conductor cable which has been filled with a polymerized water block composition.

The instant invention therefore relates to a method for restoring the dielectric properties of an in-service underground electrical cable having a central conductor encased in a polymeric insulation jacket, said cable being positioned within a surrounding conduit, comprising: filling the space between said cable and said conduit with a homogeneous mixture of a silane antitreeing agent and a dielectric oil, said dielectric oil being completely miscible with said antitreeing agent and having a solubility in said polymeric insulation of less, than 5 weight percent.

DETAILED DESCRIPTION OF THE INVENTION

Figure 1:
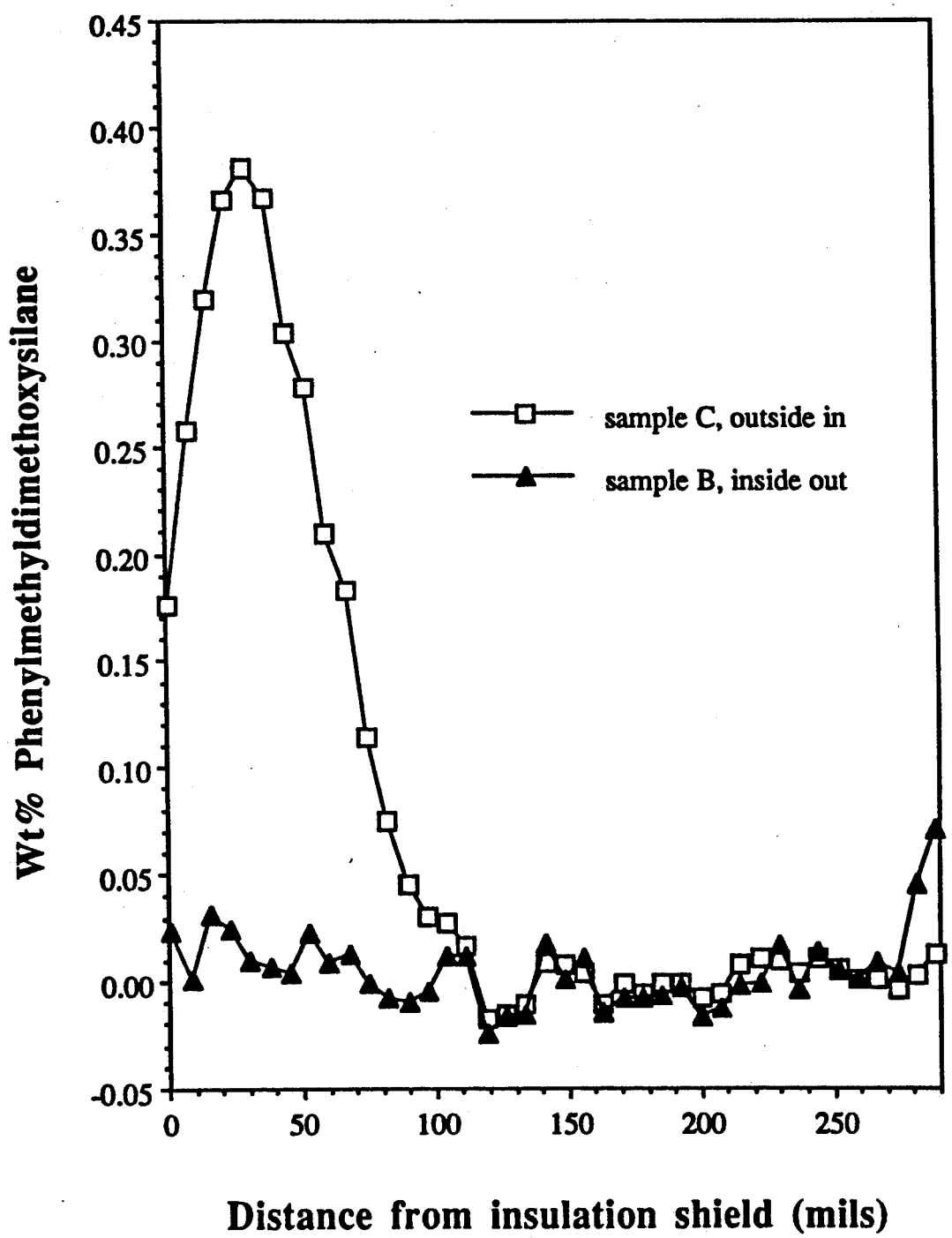
FIG. 1 is a graph showing calculated weight percent of phenylmethyldimethoxysilane in a polyethylene insulation jacket plotted as a function of the radial distance, measured from the insulation shield toward the conductor shield, wherein silane penetration by the method of the invention is compared with that of a prior art method.

In order to practice the method of the present invention, the void space between an in-service electrical cable and its surrounding conduit is filled with a restorative fluid comprising a homogeneous mixture of a silane antitreeing agent and a dielectric oil.

For the purposes of the invention, the cable is generally of the type used in underground residential distribution and typically comprises a central core of a solid or stranded copper or aluminum conductor encased in a polymeric insulation jacket. As is well known in the art, there is usually also a semi-conducting polymeric conductor shield positioned between the conductor and insulation jacket as well as a semi-conducting insulation shield covering the insulation jacket, the latter being ordinarily wrapped with a wire or metal foil grounding strip and, optionally, encased in an outer polymeric protective jacket. The insulation jacket is preferably a polyolefin polymer, such as polyethylene or a copolymer of polyethylene and propylene, or vinyl acetate. The conduit which surrounds the cable in a typical residential application is buried in the ground and the cable is pulled therethrough before electrical connections are made. This conduit is generally fabricated from polyethylene or poly(vinyl chloride) and can contain more than one electrical cable. As used herein, the term "in-service" refers to a cable/conduit system wherein the cable has been under electrical load and exposed to the elements for an extended period. In such a system, the electrical integrity of the cable insulation has generally deteriorated to some extent due to the formation of water trees, as described above.

After the cable has been in operation for an extended period, for example 7 to 15 years, the restorative fluid of the invention is introduced into the space between the cable and the conduit. Alternatively, and since there is no non-destructive test known in the art which can be used to assess the insulation integrity, a representative section of cable can be removed and subjected to dielectric breakdown tests to determine whether a particular installation is a good candidate for the restorative method of the invention.

In a preferred procedure of the instant method, the restorative fluid is poured or pumped into the above mentioned space through a suitably designed end cap positioned at one end of the conduit. Since the viscosity of the restorative fluid, described infra, is generally less than about 50 cP at 25° C. and the space between cable and conduit is relatively large, very little pressure is required to fill this space, gravity alone being sufficient in most applications. Furthermore, the low viscosity of the restorative fluid allows filling to take place at ambient temperatures, including winter conditions. When a small amount of the restorative fluid is seen to exude from a similar cap at the other end of the cable, flow is terminated and the restorative fluid is sealed within the space by any convenient means, such as a valve or a plug. It is contemplated herein that the restorative fluid may be retained in the space between cable and conduit indefinitely or it may be drained from the system after residing therein for a time sufficient to allow the silane antitreeing agent, described infra, to diffuse into the insulation of the cable. It is however preferred that the restorative fluid remain in the space for at least about one year. The skilled artisan will, of course, recognize that the diffusion of the silane antitreeing agent into the insulation will be accelerated by the heat dissipated during normal operation of the cable.

In the method of the present invention the moisture which has accumulated in the space between the cable and the conduit may be removed or its quantity reduced prior to the introduction of the restorative fluid, as described above. In this operation, a desiccant gas or liquid, such as air, nitrogen, ethanol or isopropanol, is flushed through the space between cable and conduit to either physically push out the moisture or to absorb it. Thus, for example, a high velocity dry air stream may be used to blow out bulk water which has accumulated in the aforementioned space.

It will be appreciated by those skilled in the art that all of the above operations can be carried out while the cable is under power. This presents a great advantage in terms of time and complexity over prior art techniques wherein restorative fluids are introduced into the cable's interior and electrical power has to be interrupted.

The restorative fluid of the invention is a homogeneous mixture of a silane antitreeing agent and a dielectric oil. The silanes which can be used are those which are known in the art to act as antitreeing agents and include alkylalkoxy silanes, arylalkoxysilanes and epoxy-functional alkoxysilanes, inter alia. Many such systems have been described in the patent literature and the interested reader is referred to U.S. Pat. No. 4,144,202 to Ashcraft et al., U.S. Pat. No. 4,212,756 to Ashcraft et al., U.S. Pat. No. 4,299,713 to Maringer et al., U.S. Pat. No. 4,332,957 to Braus et al., U.S. Pat. No. 4,400,429 to Barlow et al.. U.S. Pat. No. 4,608,306 to Vincent and U.S. Pat. No. 4,840,983 to Vincent, among others.

A particularly preferred silane antitreeing agent of the invention is of the type described in above cited U.S. Pat. No. 4,766,011 to Vincent et al., assigned to the assignee of the present invention and hereby incorporated by reference to teach this class of silanes. This compound is represented by the formula

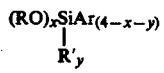

wherein R is an alkyl radical having 1 to 6 carbon atoms, R' is an alkyl radical having 1 to 6 carbon atoms, Ar is an aromatic group selected from the group consisting of phenyl and benzyl radicals, x is 1, 2 or 3, y is 0, 1 or 2 and $(x + y) \leq 3$. Highly preferred silanes of this type include phenyltrimethoxysilane, diphenyldimethoxysilane, diphenylmethylmethoxysilane and phenylmethyldimethoxysilane, the latter being most preferred.

The dielectric oil used to form the restorative fluid composition serves as a carrier for the silane and should be completely miscible therewith. This component should also exhibit a solubility of less than about 5 weight percent, preferably less than 0.1 weight percent, in the polymeric insulation of the cable. When the solubility of the dielectric oil is greater than about 5 weight percent, the insulation swells and induces excessive mechanical stress within the cable. While the dielectric oil should have a relatively low viscosity to facilitate filling and have limited solubility in the insulation, as implied above, there are no other particular restrictions on the nature of this component. Examples of suitable dielectric oils include mineral oil, polydimethylsiloxane oil, fluorosilicone oil and vegetable oil, a polydimethylsiloxane oil having a viscosity of 10 to 100 cP at 25° C. being preferred.

Other components which can be added to the restorative fluid include anti-corrosion additives, water scavengers, ion scavengers, and catalysts. The use of a catalyst to polymerize the silane antitreeing agent within the tree microvoids is described in detail in the above cited U.S. Pat. No. 4,766,011 to Vincent et al. and is a preferred embodiment of the present method.

The restorative fluid used in the instant method consists essentially of about 5 to about 50 weight percent of the silane antitreeing agent dissolved in the dielectric oil. Preferably, a mixture containing from about 5 to about 20 weight percent of the silane is so employed.

EXAMPLES

The following examples are presented to further illustrate the method of this invention, but are not to be construed as limiting the invention, which is delineated in the appended claims. All parts and percentages in the examples are on a weight basis and all measurements were obtained at 25° C., unless indicated to the contrary.

A segment of service-aged electrical cable was cut into three equal lengths designated as Samples A, B and C. The cable was manufactured by Reynolds Aluminum Co. and had the designation "M-2."The cable consisted of: a conductor having 7 strands of 10 AWG aluminum; a conductor shield having an outer diameter of 0.38 inch; a high molecular weight polyethylene insulation having an outer diameter of 0.959 inch; and a wire-wrapped conducting jacket having an outer diameter of 1.045 inches.

Sample A remained untreated and served as a control for the following procedure.

Sample B was treated with a silane antitreeing agent according to the method described in U.S. Pat. No. 4,766,011, cited supra. In this comparative example the void space between the conductor strands and the insulation jacket of the cable was filled with phenylmethyldimethoxysilane fluid and the filled cable was stored at approximately 55–60° F. for 110 days.

Sample C was treated according to the method of the present invention with a homogeneous mixture consisting of 10% phenylmethyldimethoxysilane and 90% trimethylsiloxy-terminated polydimethylsiloxane oil having a viscosity of 50 cS. This cable sample was placed inside a conduit such that the ends of the cable protruded from the conduit. The ends of the conduit were sealed around the cable and the above mixture was introduced into the space between cable and conduit to fill the void therebetween. This combination was also stored at 55–60° F. for 110 days.

After the indicated storage period, each cable was subjected to dielectric testing, but this did not provide conclusive results due to the small cable lengths employed. A small section of cable was then removed from the midsection of each sample and was refrigerated to arrest further diffusion of the silane within each cable insulation. After storage in the refrigerator for two weeks, each cable sample was cut in a radial direction at a point six inches from an end and the insulation at this point was subjected to a micro infrared mapping analysis to determine the radial distribution of silane concentration in the polyethylene insulation. This was accomplished by microtoming sections of the insulation perpendicular to the length of the cable. A micro IR map was made starting at a point just 30 microns from the insulation shield (i.e.. outer surface of the insulation) and progressing radially toward the center of the cable to a point 30 microns from the conductor shield (i.e., inner surface of the insulation). In all, 40 spectra were obtained along the radial line for each cable sample using a Fourier Transform Infrared (FTIR) microscope to determine absorbance at 1260 cm$^{-1}$. This absorption is due exclusively to the symmetric deformation of methyl radicals on silicon in the silane and is therefore representative of the silane concentration at a given point in the insulation. This interpretation is further supported by the fact that the polydimethylsiloxane oil used as a carrier for the silane is known not to diffuse into polyethylene to an appreciable degree under the above described conditions as well as the fact that IR bands due to polydimethylsiloxane were absent in all the scans.

A quantitative relationship between the silane concentration in polyethylene and the above described absorbance band was obtained from a separate experiment wherein a polyethylene sample with a gravimetrically determined amount of the silane (3.96% silane) was compared with a blank polyethylene sample (0% silane). the background absorbance of the polyethylene insulation being used to normalize the determined silane concentration for sample thickness variations. This relationship was used to calculate the silane concentration distribution for each of the microtomed sections obtained from Sample B and Sample C. These results are presented in FIG. 1, wherein the ordinate indicates percent silane concentration and the abscissa reflects the distance (in mils) from the outside surface of the insulation (i.e., the inner diameter of the insulation shield). as measured in a radial direction toward the conductor shield. From this figure, it can be seen that essentially no silane was present in the insulation of Sample B. To the contrary, the silane had apparently penetrated nearly half the insulation in the case of Sample C, the peak in this instance being thought to be due to some back diffusion which occurred during testing and storage after the cable was removed from the restorative fluid. The curves of FIG. 1 were integrated and the total percent of silane dissolved in the insulation calculated as 0.078 and zero for Sample C and Sample B, respectively. As expected, no silane was detected in the insulation of Sample A.

The absence of silane in the insulation of Sample B was surprising since such an internal treatment of a used electrical cable with the above silane is known to restore the cable's performance. It can only be speculated that the above exposure conditions of time and temperature were insufficient for the required diffusion to take place. Under identical treatment conditions, however, the method of the invention is thus seen to be more efficient in delivering the antitreeing silane to the cable insulation, where it can fill the micro voids due to water trees.

I claim:

1. A method for restoring the dielectric properties of an in-service underground electrical cable having a central conductor encased in a polymeric insulation jacket, said cable being positioned within a surrounding conduit, comprising:

filling the space between said cable and said conduit with a restorative fluid comprising a homogeneous mixture of a silane antitreeing agent and a dielectric oil, said dielectric oil being completely miscible with said antitreeing agent and having a solubility in said polymeric insulation of less than 5 weight percent.

2. The method according to claim 1, wherein said dielectric oil is polydimethylsiloxane.

3. The method according to claim 1, wherein said silane antitreeing agent is represented by the formula

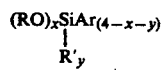

wherein R is an alkyl radical having 1 to 6 carbon atoms, R' is an alkyl radical having 1 to 6 carbon atoms, Ar is an aromatic group selected from the group consisting of phenyl and benzyl radicals. x is 1, 2 or 3, y is 0, 1 or 2 and $(x + y) \leq 3$.

4. The method according to claim 3, wherein said dielectric oil is polydimethylsiloxane.

5. The method according to claim 4, wherein Ar of said silane antitreeing agent is a phenyl radical.

6. The method according to claim 5, wherein R of said silane antitreeing agent is a methyl radical.

7. The method according to claim 6, wherein said silane antitreeing agent is phenylmethyldimethoxysilane.

8. The method according to claim 1, wherein said restorative fluid further comprises a polymerization catalyst for said silane antitreeing agent.

9. The method according to claim 2, wherein said restorative fluid further comprises a polymerization catalyst for said silane antitreeing agent.

10. The method according to claim 3, wherein said restorative fluid further comprises a polymerization catalyst for said silane antitreeing agent.

11. The method according to claim 4, wherein said restorative fluid further comprises a polymerization catalyst for said silane antitreeing agent.

12. The method according to claim 5, wherein said restorative fluid further comprises a polymerization catalyst for said silane antitreeing agent.

13. The method according to claim 6, wherein said restorative fluid further comprises a polymerization catalyst for said silane antitreeing agent.

14. The method according to claim 7, wherein said restorative fluid further comprises a polymerization catalyst for said silane antitreeing agent.

15. The method according to claim 1, wherein the space between said cable and said conduit is dried prior to being filled with said restorative fluid.

16. The method according to claim 2, wherein the space between said cable and said conduit is dried prior to being filled with said restorative fluid.

17. The method according to claim 3, wherein the space between said cable and said conduit is dried prior to being filled with said restorative fluid.

18. The method according to claim 4, wherein the space between said cable and said conduit is dried prior to being filled with said restorative fluid.

19. The method according to claim 5, wherein the space between said cable and said conduit is dried prior to being filled with said restorative fluid.

20. The method according to claim 6, wherein the space between said cable and said conduit is dried prior to being filled with said restorative fluid.

21. The method according to claim 7, wherein the space between said cable and said conduit is dried prior to being filled with said restorative fluid.

* * * * *